United States Patent
Hurley et al.

(10) Patent No.: US 6,929,682 B2
(45) Date of Patent: Aug. 16, 2005

(54) SORBENT CAPSULE

(75) Inventors: Thomas J. Hurley, Kenmore, NY (US); Keith W. Ware, Jr., Depew, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 42 days.

(21) Appl. No.: 10/660,024

(22) Filed: Sep. 11, 2003

(65) Prior Publication Data

US 2005/0056151 A1 Mar. 17, 2005

(51) Int. Cl.[7] .............. B01D 53/04; B01D 53/26
(52) U.S. Cl. .............. 96/108; 55/524; 96/153; 206/0.7; 206/204
(58) Field of Search .............. 55/514, 515, 524; 96/108, 134, 135, 149, 153, 154; 206/0.7, 204, 534.4, 700, 531.4; 220/367.1, 373

(56) References Cited

U.S. PATENT DOCUMENTS

| | | | | |
|---|---|---|---|---|
| 2,638,179 A | * | 5/1953 | Yard | 96/14 |
| 3,315,447 A | * | 4/1967 | Meier | 96/9 |
| 3,485,416 A | * | 12/1969 | Fohrman | 222/142.1 |
| 3,538,020 A | * | 11/1970 | Heskett et al. | 210/496 |
| 3,727,769 A | * | 4/1973 | Scholl | 210/484 |
| 4,093,105 A | * | 6/1978 | Russell et al. | 220/373 |
| 4,124,116 A | * | 11/1978 | McCabe, Jr. | 96/108 |
| 4,725,465 A | * | 2/1988 | Lastovich | 428/34.3 |
| 4,772,300 A | * | 9/1988 | Cullen et al. | 96/7 |
| 4,783,206 A | * | 11/1988 | Cullen et al. | 96/7 |
| 5,069,694 A | * | 12/1991 | Cullen et al. | 96/154 |
| 5,304,419 A | * | 4/1994 | Shores | 428/355 R |
| 5,500,038 A | * | 3/1996 | Dauber et al. | 96/135 |
| 5,503,662 A | * | 4/1996 | Berger | 96/108 |
| 5,665,148 A | * | 9/1997 | Muhlfeld et al. | 96/153 |
| 5,718,743 A | * | 2/1998 | Donnelly et al. | 96/135 |
| 5,730,785 A | * | 3/1998 | Idol et al. | 96/108 |
| 5,743,942 A | * | 4/1998 | Shelley et al. | 96/118 |
| 5,816,438 A | * | 10/1998 | Berger | 220/613 |
| 5,911,937 A | * | 6/1999 | Hekal | 264/255 |
| 6,429,165 B1 | * | 8/2002 | Nastke et al. | 502/159 |
| 6,540,937 B1 | * | 4/2003 | Payne et al. | 252/194 |
| 6,571,942 B2 | * | 6/2003 | Riemenschneider et al. | 206/204 |
| 2002/0188046 A1 | * | 12/2002 | McKedy et al. | 524/394 |
| 2003/0037677 A1 | * | 2/2003 | Boroson et al. | 96/108 |
| 2003/0121418 A1 | * | 7/2003 | Loop et al. | 96/117.5 |
| 2003/0153457 A1 | * | 8/2003 | Nemoto et al. | 502/402 |

* cited by examiner

Primary Examiner—Robert H. Spitzer
(74) Attorney, Agent, or Firm—Stephen B. Salai, Esq.; Brian B. Shaw, Esq.; Harter, Secrest & Emery LLP (57) ABSTRACT

An adsorbent capsule including a core of pressed adsorbent material having a water-insoluble binder, and a water-vapor or permeable coating of water-based resin, namely, hydroxypropylmethylcellulose.

17 Claims, 6 Drawing Sheets

SORBENT CAPSULE

BACKGROUND OF THE INVENTION

The present invention relates to an improved sorbent capsule of the type which is packaged with pharmaceuticals.

By way of background, sorbent cartridges such as disclosed in U.S. U.S. Pat. Nos. 4,093,105, 4,772,300 and 5,503,662 have been inserted with pharmaceuticals for the purpose of preventing their deterioration from moisture. However, the foregoing cartridges had a moisture-impermeable plastic cylindrical shell and separate porous end caps, and they were filled with uncompressed granular sorbent. Thus, their production cost included the cost of fabrication of their shells and end caps, and the labor of filling and assembling them. In addition, since their contents were uncompressed granular sorbents, their sorbent capacity was limited to their granular volume. Also, the end caps of U.S. Pat. No. 4,093,105 were screens through which objectionable dusting could occur. Also, European Patent 0387604 disclosed a pressed desiccant tablet having a binder of polyvinylpyrrolidone and having a sprayed methylhydroxypropylcellulose coating. However, the binder was water-soluble and the coating was water-based. The water-based coating could potentially degrade the pressed desiccant during a pan-coating process.

BRIEF SUMMARY OF THE INVENTION

It is accordingly one object of the present invention to provide an improved sorbent device in the nature of a sorbent capsule, rather than a cartridge, wherein a core of sorbent material is coated with a moisture permeable coating thereby obviating the labor and expense of fabricating certain prior art sorbent cartridges.

Another object of the present invention is to provide an improved sorbent device in the nature of a sorbent capsule which contains compressed sorbent, thus containing more sorbent per unit of volume than if the sorbent were in the uncompressed granular form of certain prior art sorbent cartridges.

A further object of the present invention is to provide an improved sorbent capsule which contains a pressed core of adsorbent having a binder which is not water-soluble so that it can be pan-coated with a water-based coating which does not degrade the core during the pan-coating process. Other objects and attendant advantages of the present invention will readily be perceived hereafter.

The present invention relates to a sorbent capsule comprising a core of sorbent material having a water-insoluble binder, and a water-vapor permeable water-based liquid-applied resin coating thereon.

The present invention also relates to a sorbent capsule as set forth in the immediately preceding paragraph wherein the sorbent material is compressed.

The various aspects of the present invention will be more readily understood when the following portions of the specification are read in conjunction with the accompanying drawing wherein:

DETAILED DESCRIPTION OF THE INVENTION

Figure 1:
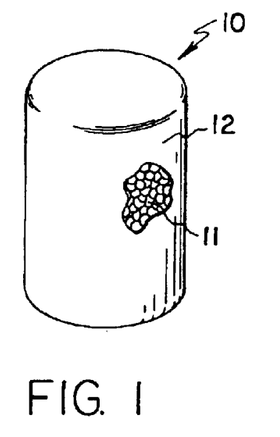
FIG. 1 is a partially broken away perspective view of one embodiment of the sorbent capsule of the present invention.

In FIG. 1, a sorbent capsule 10 is shown having a water-insoluble resin-bonded core 11 and a water-based, water-vapor permeable resin coating 12 thereon. The capsule is of cylindrical shape and has a length of approximately 0.71 inches and a diameter of approximately 0.56 inches so that it can be dispensed by standard well known dispensing equipment which is fabricated for dispensing capsules or cartridges of the foregoing dimensions into pill containers. However, the capsule can have different dimensions. The core 11, in this instance, is a compressed sorbent which can be silica gel or a combination of silica gel and activated carbon or activated carbon or molecular sieve with a binder of water-insoluble polyethylene, and it has a coating of water-based hydroxypropylmethylcellulose (HPMC) thereon. The coating 12 is permeable to water vapor and is utilized for the primary purpose of obviating dusting, considering that the sorbent capsule is intended for use in a container of pharmaceutical pills where dusting is highly undesirable. The resin coating is applied in a tumbling operation, known as pan-coating, wherein a water-based spray of the HPMC is applied thereto, as will be described in detail hereafter.

At this point it is to be noted that the HPMC is classified by the manufacturer Sensient Pharmaceutical Technologies as a moisture barrier when it is used with pharmaceuticals. However, it has been found that when the HPMC is used with a sorbent which has desiccating qualities, the sorbent capacity of the sorbent will cause the coating to pass moisture adequately, and this will be effective in preventing the moisture from penetrating a like coating on a pharmaceutical pill or tablet with which the sorbent capsule is packed. In other words when the HPMC is combined with a sorbent having desiccating qualities, the sorbent preferentially adsorbs the moisture in a container so that the moisture does not effectively permeate the pharmaceuticals with which the sorbent capsule 10 is packed.

The core 11 is fabricated by a simplified process requiring essentially only a water-insoluble polyethylene resin binder and the sorbent which are compressed by a simple pressing operation without the addition of external heat. The resin-bonded sorbent core 11 is of the type more fully described in U.S. pending patent application Ser. No. 09/853,199, filed May 11, 2001, which was published in application publication number US-2002-0188046-A1 on Dec. 12, 2002, and this publication can be referred to for details as to the physical characteristics of the core and is incorporated herein by reference. The core can be of any type described in detail in the above published patent application. While a compressed core of the type described in the above publication is preferred, other types of compressed adsorbent cores having water-insoluble binders can be used, or if desired, any other type of adsorbent or absorbent core having a water-insoluble binder can be used. Such cores can be moisture, odor, oxygen-scavenging or other gas-scavenging materials.

The permeable liquid-applied resin coating 12 of FIG. 1, as noted above, consists of water-based HPMC. The coating 12 has been applied by a pan-coating process in a tumbler which is made by the Thomas Engineering, Inc., Model No. COMPU-LAB24 and, as noted above, a 10% solids solution of HPMC is sprayed onto the cores 11 as they are being tumbled in accordance with a conventional pan-coating technique. The specific coating which is used is Identified by No. 50821 SPECTRABLEND CLEAR of Sensient Pharmaceutical Technologies. It will be appreciated that other moisture permeable coatings including but not limited to cellulose ether resins, such as methyl cellulose and hydroxypropyl cellulose, and cellulose ester resins, such as nitrocellulose, and polyvinylpropyliodones, and polyvinyl alcohols and acrylic resins, and vegetable gums, and starches, and natural and synthetic waxes, and gelatins may also be used.

The HPMC coating not only prevents dusting, but also enhances the integrity of the core by making it stronger against breakage and chipping, both of which are highly undesirable when the adsorbent is used in a pill container. Testing in the foregoing respect is as follows where uncoated compressed forms were subjected to compression tests as against the identical compressed forms which were coated. In this respect, the amount of coating which is utilized on each core is approximately 2% by weight of the total weight of the coated capsule. However, the coating can be any desired thickness, provided that it remains permeable to moisture and gases.

EXAMPLES OF RELATIVE CRUSH STRENGTHS

The following crush tests were performed on a Chatillon crush tester Model TCM 201. The capsules were fabricated by weight of 80% silica gel and 20% polyethylene binder which were compressed as follows. In this respect approximately 2.8 grams of dry granular silica gel having a size of less than 3 mm and dry polyethylene having a nominal size of 50 microns in the above proportions were placed in a cylindrical die cavity having a diameter of 0.56 inches and the compression was conducted without the addition of external heat until the capsule core reached a length of approximately 0.71 inches. The polyethylene was of the low density type available under the trade name of EQUISTAR MICROTHENE FN 510-00. The foregoing cores were placed on a substantially flat base with their longitudinal axes substantially parallel thereto. The entire length of the capsule rested on the base. A flat plunger was pressed against the opposite side of the capsule. The average crush strength of thirty samples was about 28 pounds. The coated samples were coated in a twenty-four inch pan in a Thomas Engineering, Inc. Model No. COMPU-LAB24 tumbler wherein a 10% solids solution of HPMC was sprayed thereon for between 65–75 minutes or until an approximately 2.0–2.5 percent coat weight was achieved. The parameters for the coater were as follows: Exhaust temperature 55° C.; 5 revolutions per minute; inlet flow 360 cubic feet per minute; atomized air 47.5° C. The specimens were then air dried for ten minutes at 53° C. and then permitted to cool at ambient temperature. The average crush strength of ten coated samples was approximately 50 pounds. The foregoing specimens were of the type shown in FIG. 1 without heat activation. In addition three samples were tested wherein the adsorbent core which was fabricated in the above manner was heat activated at 110° C. for about three hours, and this resulted in fusing of the polyethylene binder. Thereafter, the heat-activated core was coated in the above manner and upon testing the samples had a crush strength of greater than 99 pounds. The foregoing specimens were of the type shown in FIG. 1. However, the adsorbent capacity was reduced, but it was still in excess of a granular canister of the same volume.

Figure 5:
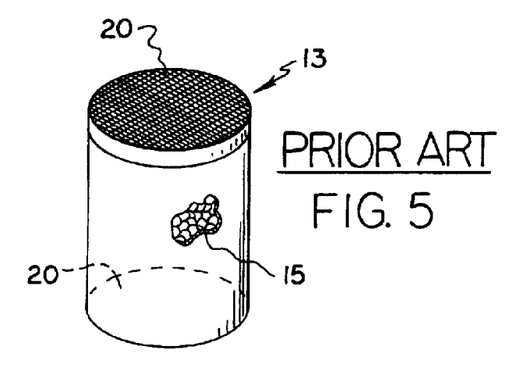
FIG. 5 is a partially broken away perspective view of a prior art sorbent cartridge.
Figure 6:
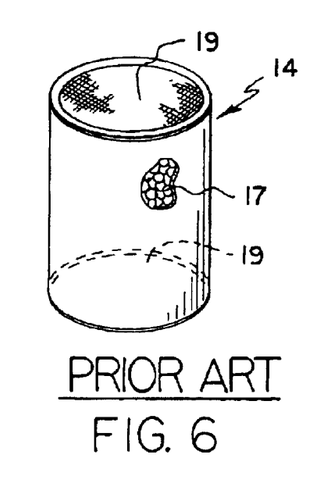
FIG. 6 is a partially broken away perspective view of yet another prior art sorbent cartridge.
Figure 7:
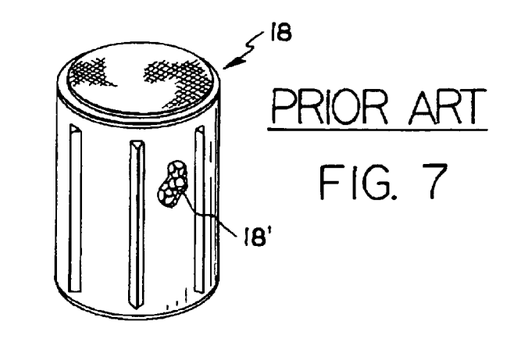
FIG. 7 is a perspective view of still another prior art sorbent cartridge.

At this point it is to be noted that the pressed core can contain up to twice the weight of uncompressed granular material than in a prior art cartridge of the same volume. Therefore the capsule 10 of the same volume as a cartridge containing uncompressed granular sorbent will have a greater sorbent capacity. This can provide more efficient sorbing of moisture. Furthermore, in this respect, the prior art cartridges 13, 14 and 18 contain granules 15, 17 and 18', respectively. The prior art cartridge 13 of FIG. 5 is fully disclosed in U.S. Pat. No. 4,093,105, and the prior art cartridge 14 of FIG. 6 is fully disclosed in U.S. Pat. No. 5,503,662, and the prior art cartridge of FIG. 7 is fully disclosed in U.S. Pat. No. 4,772,300. It is also to be noted that while the ends 19 of cartridge 14 are porous polyethylene which will not permit passage of dust therethrough, the ends of cartridge 13 are screens 20 which may permit dusting. As noted above, the HPMC 12 of sorbent capsule 10 encapsulates the entire core so that there is absolutely no dusting.

Figures 2, 3:
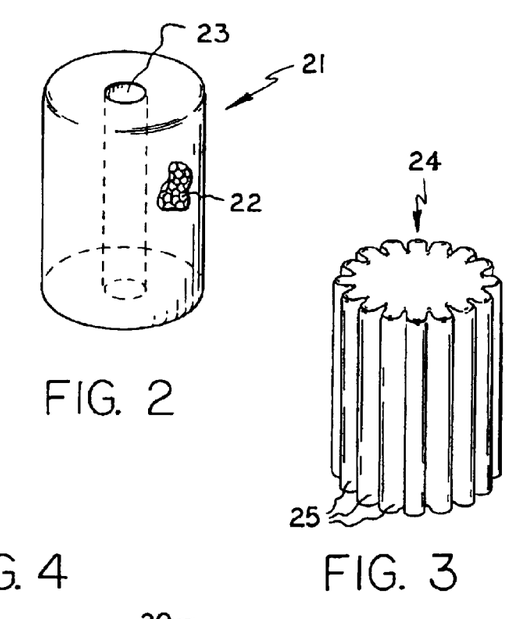
FIG. 2 is a partially broken away perspective view of another embodiment of a sorbent capsule of the present invention.
FIG. 3 is a perspective view of yet another embodiment of the sorbent capsule of the present invention.

In FIG. 2 another embodiment of the present invention is disclosed. The capsule 21 has an annular sorbent core 22 which was fabricated in the same manner as cylindrical core 11 of FIG. 1. However, the sorbent capsule 21 has a cylindrical bore 23 of 0.17 inches diameter therethrough. Both the entire outer surface and the surface of the cylindrical bore are coated with HPMC in the above-described manner. However, the bore may not be completely coated. The bore permits the utilization of less sorbent while also giving more surface area through which moisture or other gases can be adsorbed. The embodiment of FIG. 2 can be heat-activated at 110° C. for about three hours before it is coated in the above-described manner.

Another sorbent capsule 24 is shown in FIG. 3. The only difference between the sorbent capsule 10 and sorbent capsule 24 is that the outer sides contain ridges or flutes 25 which create greater outer surface area than the purely cylindrical outer surface of the embodiments of FIGS. 1 and 2. Also, the outer fluted surface is advantageous when the capsule 24 is packaged with medicine or pills or capsules because it will have a different feel than a purely cylindrical capsule to thereby alert a person that it is something other than a pill.

Figure 4:
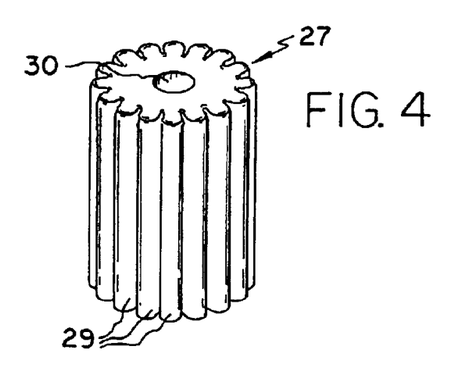
FIG. 4 is a perspective view of yet another embodiment of a sorbent capsule of the present invention.

In FIG. 4, a still further embodiment of a sorbent unit 27 is disclosed wherein the side has ridges or flutes 29, as in FIG. 3, and it has a central bore 30 as in FIG. 2.

EXAMPLES OF SORBENCY OF VARIOUS CONFIGURATIONS UNDER VARIOUS CONDITIONS

Figure 8:
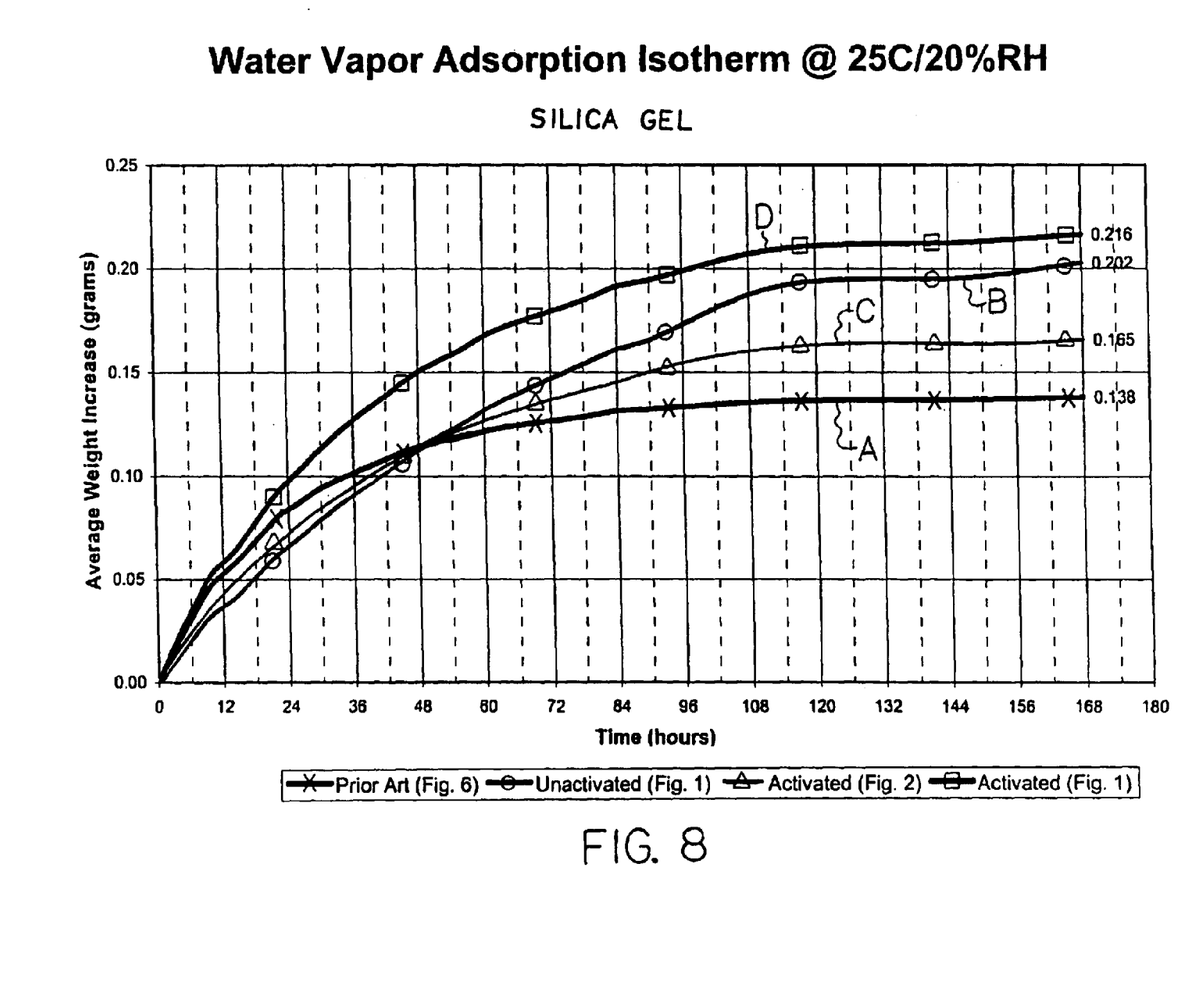
FIG. 8 is a graph showing the relative sorbent capacities of four groups of cylindrical sorbent forms of silica gel having outer dimensions of approximately 0.71 inches in length and 0.56 inches in diameter under conditions of 25° C. and 20% relative humidity.

FIG. 8 compares the sorbency of four different configurations of cylindrical sorbent capsules having a length of about 0.71 inches and a diameter of about 0.56 inches. The prior art SORBICAP® cartridge (FIG. 6) has an impermeable cylindrical shell and porous end caps and contains one gram of uncompressed granular silica gel. The curve A shows that it adsorbed 0.138 grams of water after 168 hours under the conditions stated in FIG. 8. The curve B shows that a solid coated sorbent of FIG. 1 having the same outer dimensions noted above which was manufactured as described above and weighed 2.8 grams. It contained compressed granular silica gel (2.24 grams) and water-insoluble binder (0.56 grams) of the type described above. It adsorbed 0.202 grams of moisture after 168 hours under conditions of FIG. 8. Curve C shows that a solid coated adsorbent of FIG. 2 which was heat-activated, as described above, and which had a 0.17 inch diameter hole centrally drilled therethrough and which weighed approximately 2.5 grams. It contained compressed silica gel (2 grams) and binder (0.5 grams) and adsorbed 0.165 grams of moisture under the conditions of FIG. 8. The lower reading than curve B is believed to be due to the reduced weight of silica gel and "blinding" of pores due to heat-activation (melting) of polyethylene binder. However, it still adsorbed more moisture than that shown for the prior art cartridge of curve A. Curve D shows that a solid coated cylindrical sorbent of FIG. 1 such as described above relative to curve B and which was further activated by the heating process described above adsorbed 0.216 grams of moisture after 168 hours.

Figure 9:
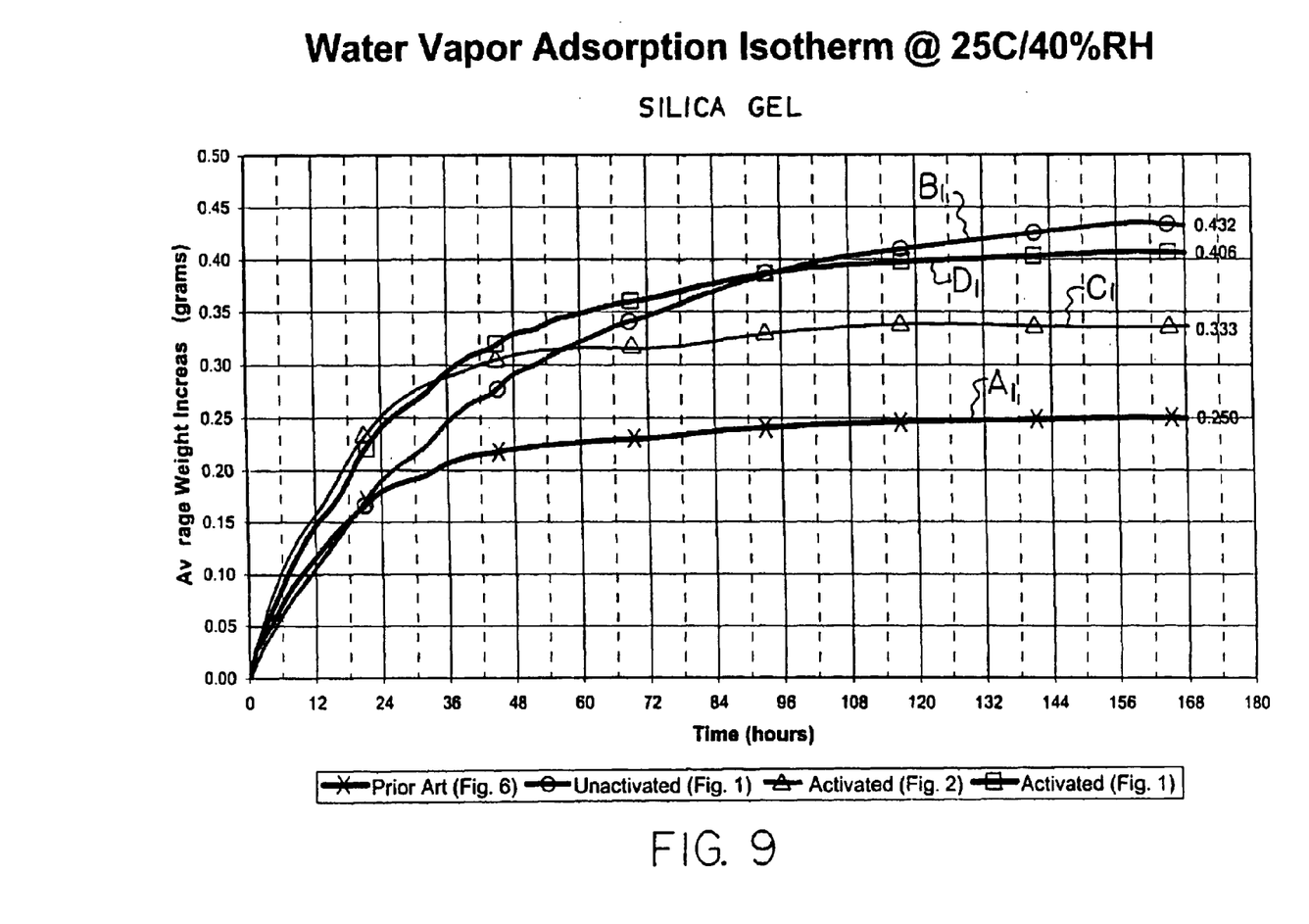
FIG. 9 is a graph similar to FIG. 8 but taken under conditions of 25° C. and 40% relative humidity.

FIG. 9 shows the results of tests of the same adsorbents as discussed above relative to FIG. 8 but under the conditions of 25° C. and 40% relative humidity. Curves A1, B1, C1 and D1 correspond to curves A, B, C and D, respectively, of FIG. 8. A comparison of FIGS. 8 and 9 shows that the solid compressed sorbent of FIG. 1, both unactivated and activated (curves B1 and D1), performed better than the cartridge of granulated adsorbent (FIG. 6, curve A1) and the compressed one with a hole therein (FIG. 2, curve C1). The amounts of moisture adsorbed by each item at the end of 168 hours is shown on the graph.

Figure 10:
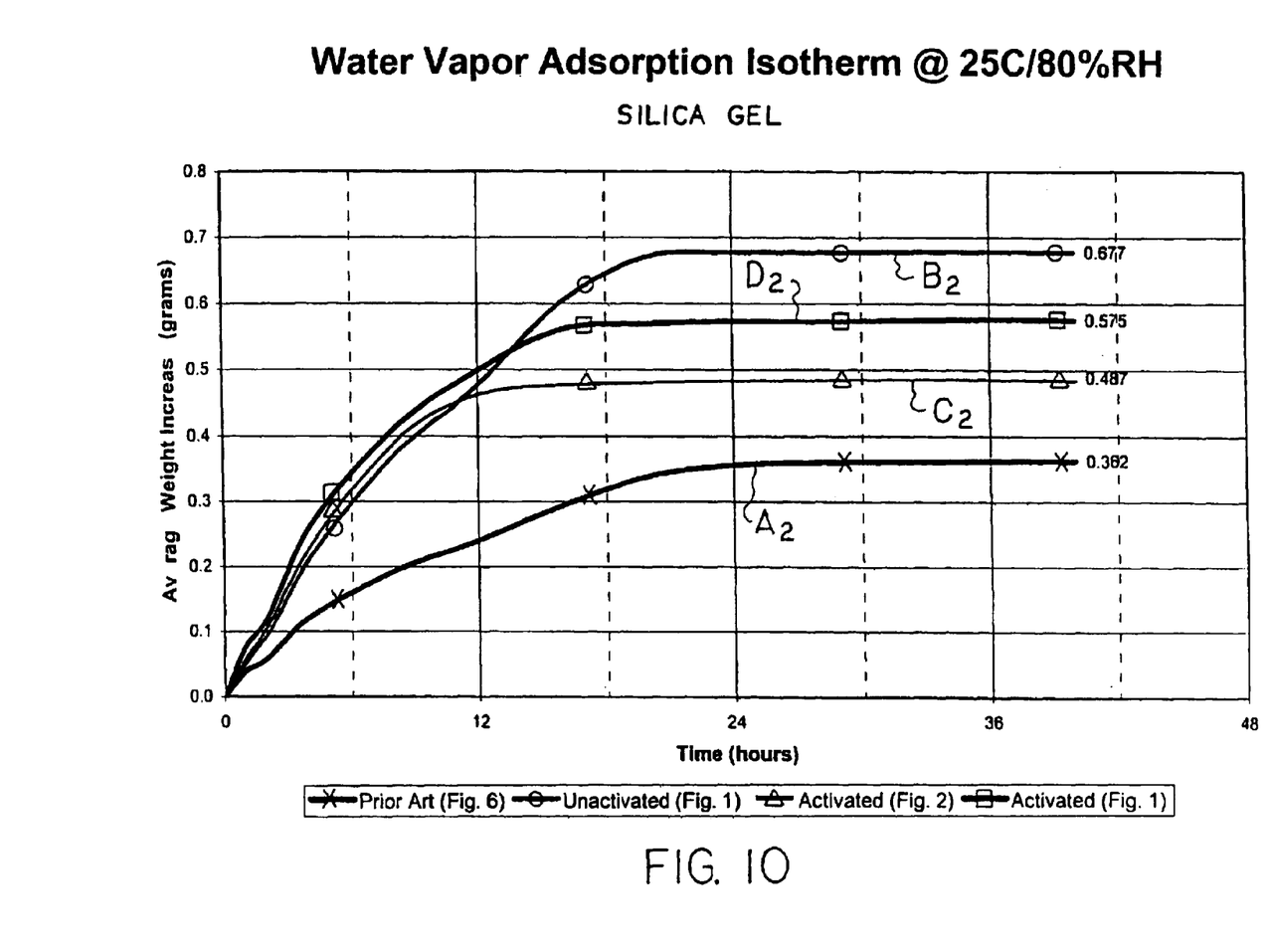
FIG. 10 is a graph similar to FIG. 8 but taken under conditions of 25° C. and 80% relative humidity.

FIG. 10 shows the results of tests of the same adsorbents discussed above relative to FIG. 8 but under the conditions of 25° C. and 80% relative humidity. Curves A2, B2, C2 and D2 correspond to curves A, B, C and D, respectively, of FIG. 8, and to curves A1, B1, C1 and D1, respectively, of FIG. 9. Here, again, a comparison of FIG. 10 with both FIGS. 8 and 9 shows that the solid compressed adsorbent (FIG. 1, curve B2) functioned better than the cartridge of granulated adsorbent (FIG. 6, curve A2) and the compressed one with a hole in it (FIG. 2, curve C2). The amounts of moisture adsorbed after about 40 hours is shown on the graph.

Figure 11:
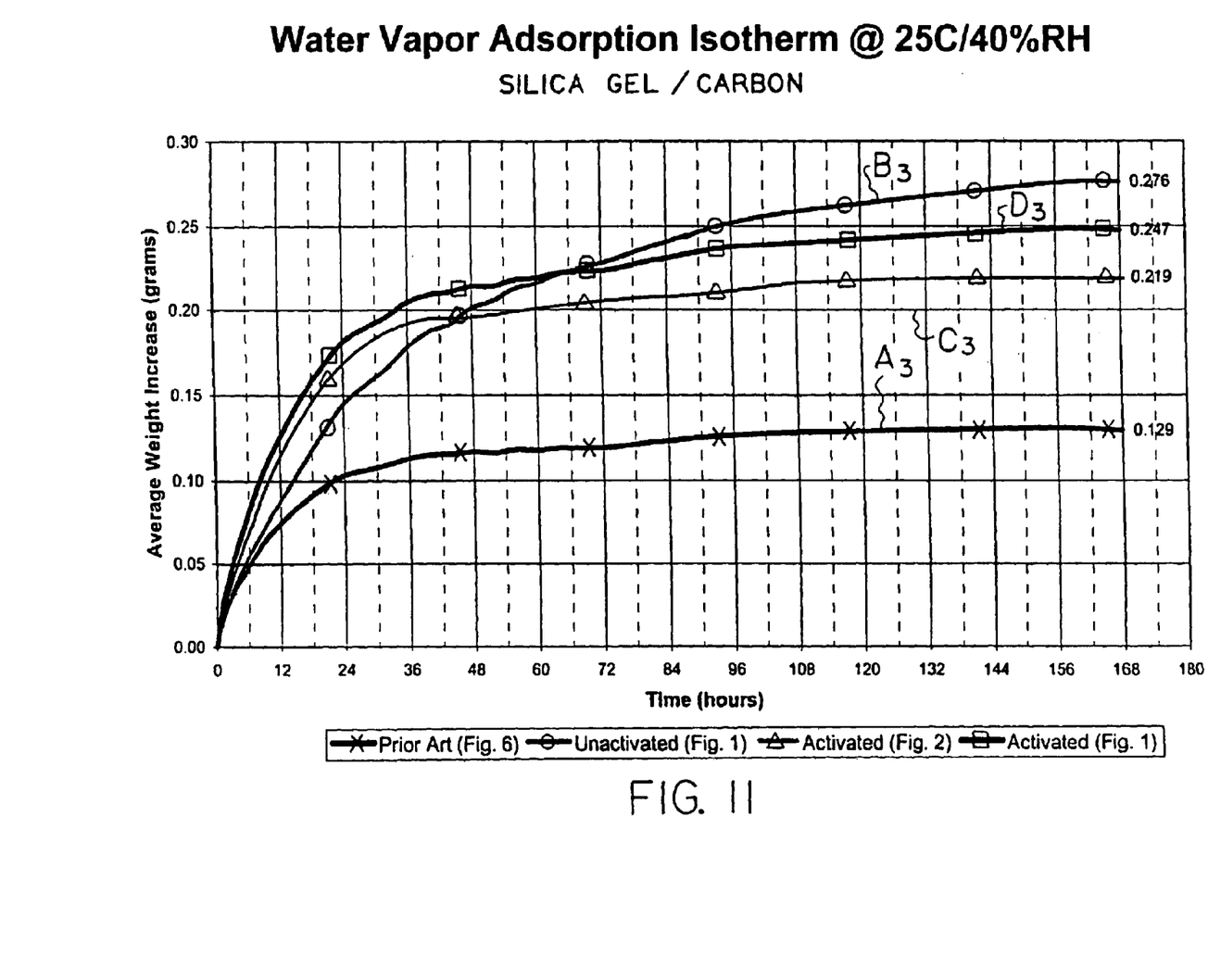
FIG. 11 is a graph similar to FIG. 8 taken under conditions of 25° C. and 40% relative humidity but having a adsorbent composition of silica gel and activated carbon.

FIG. 11 shows the results of tests of the various adsorbent configurations of FIG. 8 under the conditions of 25° C. and 40% relative humidity. However, the adsorbent composition, by weight, was 60% silica gel of a size of less than 0.3 mm and 40% activated carbon of a size of 50×200 mesh and had a total weight of approximately 2.6 grams (2.08 grams of combined adsorbent and 0.52 grams of binder) which was compressed without the addition of external heat to a cylindrical form having a length of 0.71 inches and a diameter of 0.56 inches. The composition by weight contained 20% low density polyethylene of the above-described type and 80% of the above 60–40 silica gel-carbon composition. The holed product, FIG. 2 and curve C, had a total weight of 2.3 grams (1.84 grams of combined adsorbent and 0.46 grams of binder). The prior art product of FIG. 6 contained one gram of the above silica gel-activated carbon mixture. Curves A3, B3, C3 and D3 correspond to like-lettered curves of FIGS. 8, 9 and 10. Here, again, FIG. 11 shows that the solid compressed adsorbents (FIG. 1, curves B3 and D3) functioned better than the cartridge of granulated adsorbent (FIG. 6, curve A3) and the compressed one with a hole in it (FIG. 2, curve C3).

Figure 12:
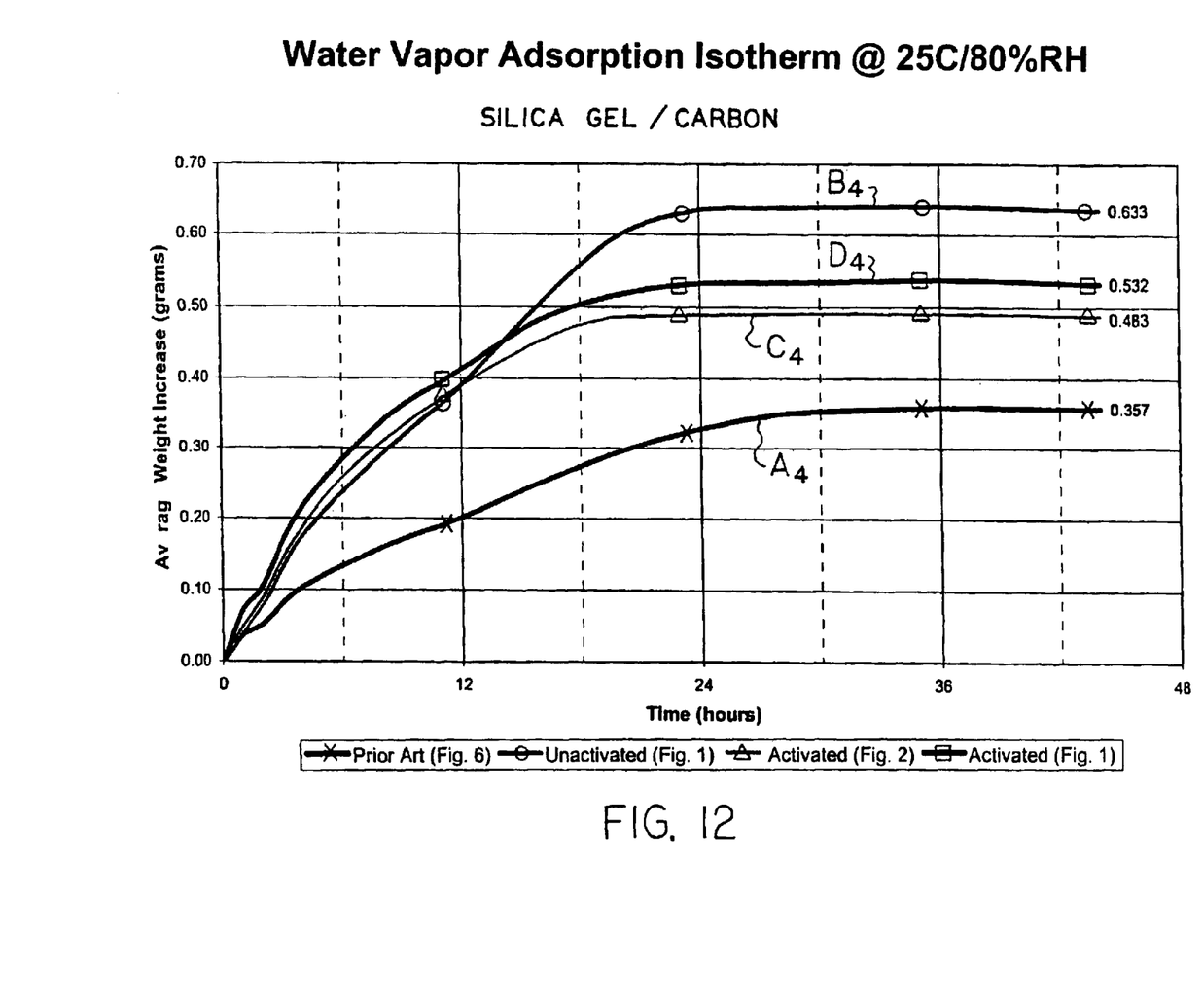
FIG. 12 is a graph similar to FIG. 11 but taken under conditions of 25° C. and 80% relative humidity.

FIG. 12 shows the tests of various adsorbent units described above relative to FIG. 11, but tested under conditions of 25° C. and 80% relative humidity. Curves A4, B4, C4 and D4 correspond to like-lettered curves of FIGS. 8–11. Here, again, FIG. 12 shows the compressed solid configurations, both activated (curve D4) and unactivated (curve B4) functioned better than the cartridge of granulated adsorbent (FIG. 6, curve A4) and the compressed one with a hole in it (FIG. 2, curve C4).

While the binder for all of the tested embodiments was the above-mentioned low density polyethylene known as EQUISTAR MICROTHENE FN 510-00, it will be appreciated that, as stated in the above-mentioned patent application publication number US-2002-0188046-A1, various types of powdered polyethylene including low density, medium density and high density polyethylene can be used, and, as further stated in said publication, it is believed that other resins including but not limited to polypropylenes, polystyrenes, polyamides, polyvinyl chlorides and hydrocarbon polymers may be used as the resin.

While all of the capsule embodiments of the present invention are of general substantially cylindrical outer configuration, it will be appreciated that it can be fabricated in any desired shape, which includes, without limitation, flat disc-like shapes and rectangular shapes.

While preferred embodiments of the present invention have been disclosed, it will be appreciated that the present invention is not limited thereto but may be otherwise embodied within the scope of the following claims.

What is claimed is:

1. An adsorbent capsule comprising a pressed core of sorbent material having a water-insoluble binder, and a permeable water-soluble resin coating thereon.

2. An adsorbent capsule as set forth in claim 1 wherein said coating comprises hydroxypropylmethylcellulose.

3. An adsorbent capsule as set forth in claim 2 wherein said pressed core of sorbent material is selected from the group consisting of silica gel and activated carbon and combinations thereof.

4. An adsorbent capsule as set forth in claim 1 wherein said pressed core of sorbent material is selected from the group consisting of silica gel and activated carbon and combinations thereof.

5. An adsorbent capsule as set forth in claim 4 wherein said water-insoluble binder comprises polyethylene.

6. An adsorbent capsule as set forth in claim 1 wherein said capsule is of solid cylindrical form.

7. An adsorbent capsule as set forth in claim 6 wherein said coating comprises hydroxypropylmethylcellulose.

8. An adsorbent capsule as set forth in claim 7 wherein said pressed core of sorbent material is selected from the group consisting of silica gel and activated carbon and combinations thereof.

9. An adsorbent capsule as set forth in claim 6 wherein said pressed core of sorbent material is selected from the group consisting of silica gel and activated carbon and combinations thereof.

10. An adsorbent capsule as set forth in claim 1 wherein said capsule is of cylindrical annular form.

11. An adsorbent capsule as set forth in claim 10 wherein said coating comprises hydroxypropylmethylcellulose.

12. An adsorbent capsule as set forth in claim 11 wherein said pressed core of sorbent material is selected from the group consisting of silica gel and activated carbon and combinations thereof.

13. An adsorbent capsule as set forth in claim 10 wherein said pressed core of sorbent material is selected from the group consisting of silica gel and activated carbon and combinations thereof.

14. An adsorbent capsule as set forth in claim 1 wherein said capsule includes a ridged outer surface.

15. An adsorbent capsule as set forth in claim 14 wherein said coating comprises hydroxypropylmethylcellulose.

16. An adsorbent capsule as set forth in claim 15 wherein said pressed core of sorbent material is selected from the group consisting of silica gel and activated carbon and combinations thereof.

17. An adsorbent capsule as set forth in claim 14 wherein said pressed core of sorbent material is selected from the group consisting of silica gel and activated carbon and combinations thereof.

* * * * *